Figure 1:
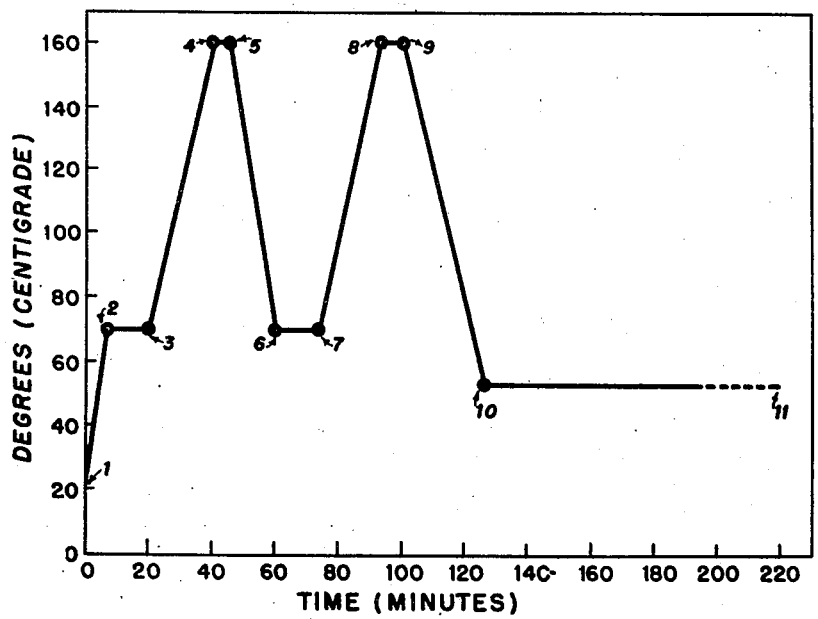

Feb. 11, 1947.    R. G. DWORSCHACK ET AL    2,415,734
SACCHARIFICATION PROCESS
Filed Oct. 27, 1944    3 Sheets-Sheet 1

TIME—TEMPERATURE PROGRESS GRAPH

Inventors
R. G. DWORSCHACK
E. M. BURDICK

By A. J. Kramer
Attorney

Feb. 11, 1947. R. G. DWORSCHACK ET AL 2,415,734
SACCHARIFICATION PROCESS
Filed Oct. 27, 1944   3 Sheets-Sheet 2

Inventor
R. G. DWORSCHACK
E. M. BURDICK

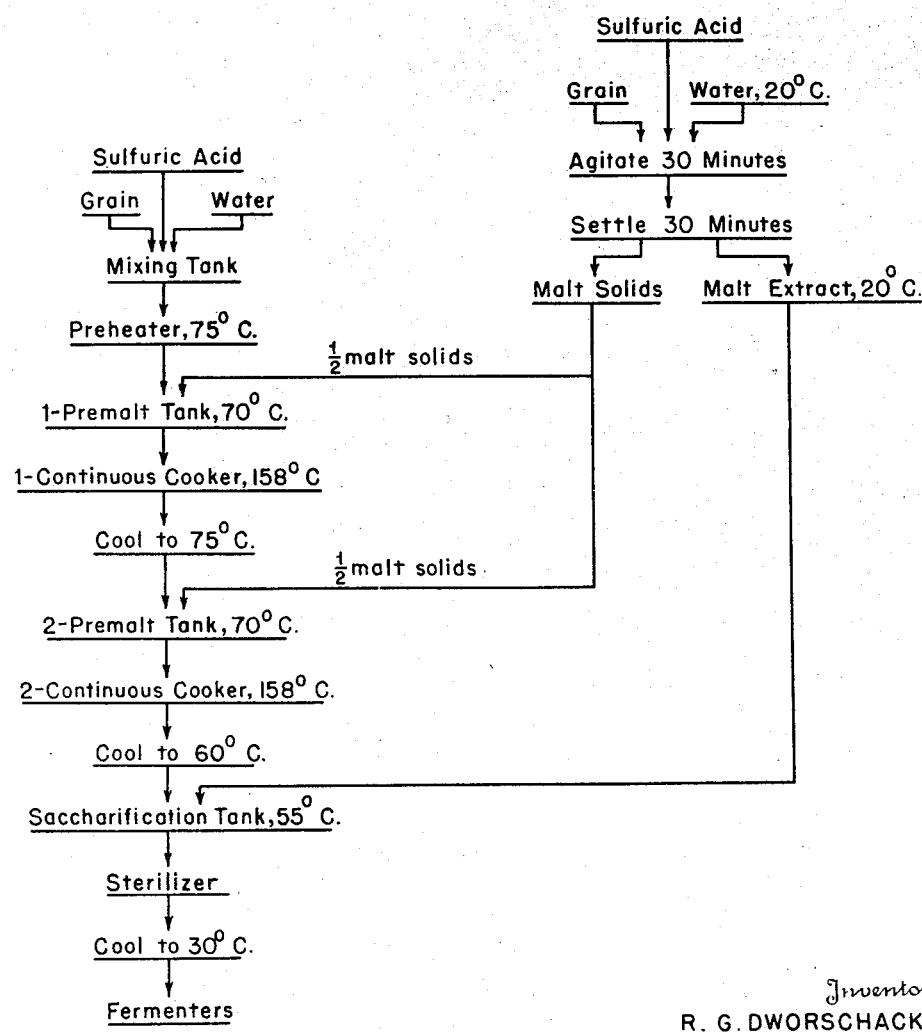

Patented Feb. 11, 1947

2,415,734

UNITED STATES PATENT OFFICE 2,415,734

SACCHARIFICATION PROCESS

Robert G. Dworschack, Milwaukee, Wis., and Everette M. Burdick, Peoria, Ill., assignors to United States of America, as represented by the Secretary of Agriculture Application October 27, 1944, Serial No. 560,582

9 Claims. (Cl. 195—18)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

In certain fermentation of grains and other starchy materials, as well as in the preparation of syrup from grains, it is necessary to convert the starch to a fermentable carbohydrate, such as maltose or dextrose. This conversion, particularly in the alcohol fermentation process, is ordinarily accomplished with barley malt, which is added to the cooked mash in the proportion of about 10 parts of ground barley malt to 100 parts of grain.

A great number of different premalting, cooking, and saccharification procedures are used commercially. These procedures are varied to fit plant conditions and equipment. Generally, about 1-2 percent of ground barley malt is added to a 30-40 percent grain-water mixture, the pH being adjusted to 5.4-5.6 with acid. The mixture is heated to about 70° C., at which temperature, it is held for 30-60 minutes to liquefy the gelatinized starch. This step is known as premalting. Following this, the liquefied mash is cooked only once in the conventional procedure. The cooking temperatures may vary from 100° C. to 160° C., the pressures from 0 to 75 lbs./sq. in. gauge, and the holding times from 3 to 60 minutes. The mashes are usually cooled to 60-65° C., and a malt slurry containing the remaining 8-9 percent malt is added for the saccharification. The period of saccharification is also variable, but recently there has been a tendency in the alcohol industry to "flash convert," that is, to add the malt slurry at 60-65° C. and hold about one minute, then immediately cool the mash to 30° C. Formerly, this period varied 15-60 minutes. In plants that do not have pressure cookers, atmospheric cooking (boiling temperatures) for 30-60 minutes is used.

Another method sometimes used is the so-called "infusion method" whereby a 30-40 percent grain-water mixture containing 1-2 percent barley malt, is heated to 65° C. in about 45 minutes and held at this temperature for approximately 60 minutes. The mash is then cooled to 60° C. and the malt slurry is added for the saccharification. In all cases, after the saccharification period, the mash is cooled to about 30° C., pumped to the fermenter, and inoculated.

Other methods and techniques have been used in an effort to secure a complete conversion of starch to fermentable sugar. Diastatic materials, such as green barley malt; malted corn, wheat, or rye; barley malt and soybean meal; and molds (especially Aspergilli and Mucors) have been used. These efforts have for the most part been unsuccessful in comparison with malt. Also, by treating starch at elevated temperatures and pressures with dilute mineral or organic acids, it may be converted to fermentable sugars, but, in general, this process is less efficient than with malt and special, expensive acid-resistant apparatus is required, thereby adding to the difficulties of the operation.

Various other special techniques, such as varying the temperatures and holding times of the premalting steps, varying the pressures, temperatures, and holding times during the cooking process, varying saccharification temperatures and holding times, controlling the pH of the mash, and using malt to grain ratios greater than 1:10, have been employed in an effort to convert completely the starch in the grains. No combination of these factors has materially improved the conversion of starch to fermentable sugar, insofar as completeness of conversion is concerned.

Only about 85 percent of the available carbohydrate in either grain or starchy materials is ordinarily converted to ethyl alcohol and carbon dioxide in the alcoholic fermentation when malt is the saccharifying agent. The balance of the carbohydrate remains in the beer, mainly in the form of unfermentable dextrins, which represents partially converted starch. Generally, in the modern distillery, a conversion of 60-65 percent of the starch to fermentable sugar is obtained at the end of the saccharification operation, when barley malt is the saccharifying agent. This much conversion is rather easily accomplished. However, since the saccharification of the mash is usually conducted at temperatures below those which will destroy diastase, there will be active diastase present throughout the usual 3-day fermentation period. The active diastase or the growing yeast, or both, converts an additional 20-25 percent of the starch and resistant dextrins to fermentable sugar as the fermentation proceeds. Hence, the total conversion of 85 percent of the starch is obtained only upon the completion of the ferementation.

In general, prior methods employed to saccharify starchy mashes have many limitations. Foremost is the incomplete conversion of starch to fermentable sugars at the end of the saccharification period. This conversion is improved during the fermentation, but the process is very slow and greatly lengthens the fermentation time. Such mashes cannot be utilized for many pure culture fermentations, since it is impractical to sterilize mashes which are only 60–65 percent converted. It is also impractical to recover the unfermentable portion of the grains before fermentation because such mashes are slimy and unfilterable.

It is an object of our invention to produce in a relatively short period a "completely converted" mash (i. e., 85 percent of the starch available as fermentable sugars), eliminating the necessity of having active diastase throughout the fermentation. It is possible to sterilize completely such a mash under high temperatures and pressures without loss of fermentability. By the words "completely converted" mash, we mean the same degree and amount of conversion that is obtained from grains and starchy materials in the ordinary procedure by saccharifying with barley malt and fermenting for about 3 days with yeast to ethyl alcohol and carbon dioxide. Although the conversion period may vary in practice due to differences in plant equipment, space, and schedules, a conversion time of 1 to 3 hours is feasible.

It is an object of this invention also to decrease the required fermentation time of the mashes by eliminating the so-called "after fermentation" (conversion of the resistant dextrins to fermentable sugar with subsequent fermentation) which is a very slow process as ordinarily conducted. In addition, our invention makes possible the removal of the unfermentable portion of the grains before the fermentation, to simplify the recovery of byproducts.

We have found that not more than three hours is required to produce a mash having a complete conversion of the starch and a high degree of filterability from grain-water and starchy material-water mixtures if premalted and cooked under certain conditions two or more times and that complete fermentation to ethyl alcohol can be accomplished in one day.

Our process may be carried out in any one of several ways, each yielding essentially the same result. It is, however, necessary to make first a malt slurry containing 1 part by weight of malt to about 10 parts by weight of water, the malt being equivalent to about 10 percent of the grain to be saccharified. The pH of the slurry is adjusted to 4.9–5.2 with acid. The slurry is stirred for one-half hour and allowed to settle for one-half hour. The milky malt extract is separated and kept at 20° C. until ready for use as the saccharification agent. The residual malt solids are used in the premalting steps. Under these conditions, all the starchy material in the barley malt, as well as that in the grains, is subjected to cooking at high temperatures and pressures. This is advantageous because all the starch is modified in such a manner that its conversion to fermentable sugar by malt diastase is rapid and complete and also because the starch in its modified condition will permit screening or filter pressing the mash either before or after fermentation without difficulty.

In processing whole corn, for example, we prefer to use a 30–40 percent corn-water mixture at a pH of 5.0–5.6 adjusted with concentrated sulfuric acid and heated to 70–75° C. to gelatinize all the starchy material. About one-half the malt residue is added to this grain slurry and the temperature held for about 15 minutes between 70–75° C. The temperature is then raised gradually to boiling (2–3 minutes) and finally above 150° C. (steam pressure, 55 lbs./sq. in. gauge or over). The mash is held at this temperature and pressure for about 5 minutes and then lowered to 75–80° C. in about 15–20 minutes. The second half of the malt slurry residue is added, lowering the temperature of the mash to 70–75° C. where it is held for another 15 minutes. The temperature is again raised as in the preceding operation, held for 5 minutes, and lowered to 60° C. at which time the malt extract is added as a saccharification agent. The required time of saccharification is usually from 1–3 hours. The starch in the mash will then be completely converted to fermentable sugar and will give a negative test for both starch and dextrin when using dilute iodine solution as the indicator. Therefore, if an absolutely sterile mash is desired, it can be sterilized under high temperatures and pressures. In the alcoholic fermentation, further sterilization is not necessary and such mashes will ferment completely in one day, as compared to the three-day fermentation period ordinarily required.

The preceding conditions will hold equally well for the processing of other grains and starchy materials. It is necessary only to modify slightly some of the conditions, especially in the cooking operation, to prevent caramelization of the sugars and charring of the grain. However, it is essential that the temperature in at least one of the cooking steps be 150° C. (steam pressure, 55 lbs./sq. in. gauge), for it is at or above this temperature that the solubility of the amylo-pectin portion of starch is greatly increased. This factor, coupled with the denaturation of the proteins at such elevated temperatures, eliminates all the slimy characteristics of the mash. The high temperature is also necessary to effect complete removal of all the starch from the grains. After the saccharification period, the mash will give a negative starch test with dilute iodine solution. Although a negative iodine test is an indication of a good conversion of the starch to fermentable sugar, it is not a satisfactory test for the extent of the conversion, for the di-, tri-, and tetra-saccharides will not show a color with iodine. These oligosaccharides are known as the "limit dextrins" and are converted to fermentable sugar only with extreme difficulty.

Figure 2:
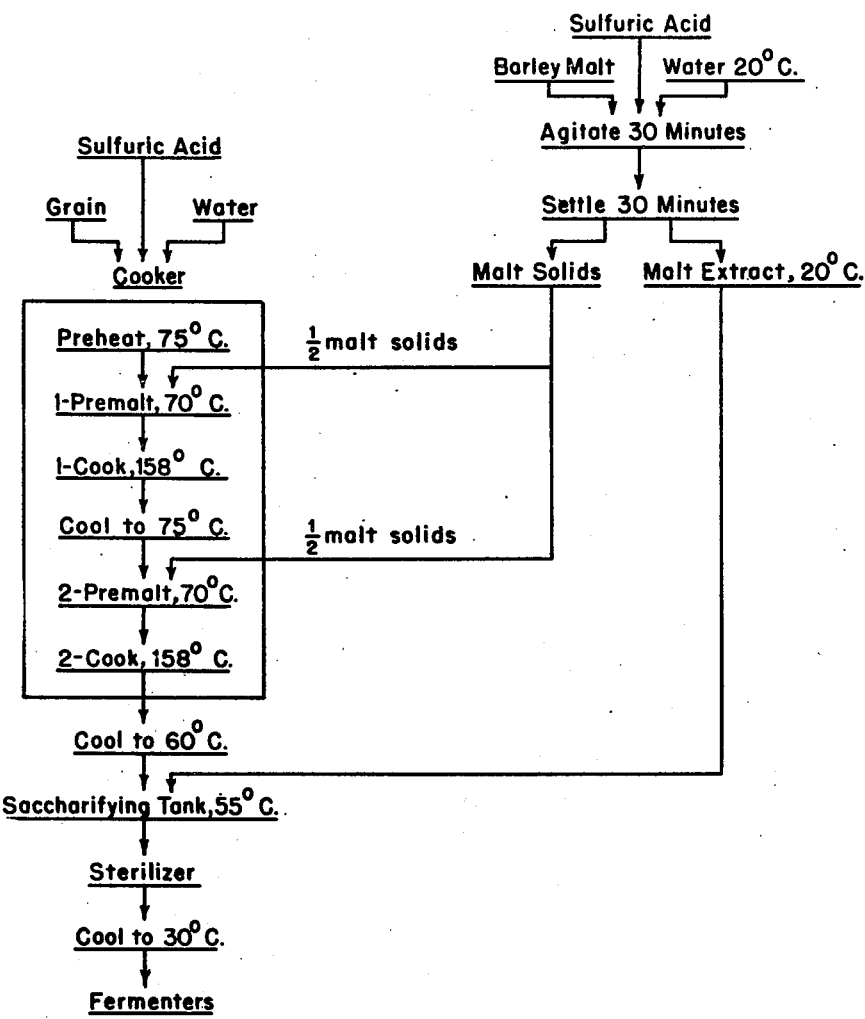

In the accompanying drawings, Figure 1 shows graphically the process of mashing the grains as described herein, and Figures 2 and 3 are flow diagrams of the batch and continuous cooking procedures, respectively.

The grains and/or starchy materials are mixed with water in the proportion of 3–4 parts of the material to 6–7 parts of water and the pH of the mixture is adjusted to 5.0–5.6 with acid. (Point 1, Figure 1. See also Figures 2 and 3.) The temperature is then raised to 70–75° C. (point 2, Figure 1) and one-half of the malt solids is added for the first premalt. The temperature is maintained at 70–75° C. during the premalting step. Under these conditions, the beta-amylase, sugar-forming enzyme of malt, will be rapidly destroyed. The alpha-amylase is much more heat-resistant and although part of it is inactivated, that fraction which has not been destroyed is greatly stimulated at this temperature. The activity of the alpha-amylase is most desirable during this period as it will liquefy the mash as well as split the starch molecules into smaller malto-dextrins. These dextrins are readily attacked by the beta-amylase in the malt extract which is later added for the saccharification. Since the sugar-forming enzyme has been destroyed and the optimum temperature for the sugar formation is considerably below 70° C., there will be little sugar formed under these conditions (points 2–3, 6–7). It is desirable to have as little sugar formed as possible during the premalting steps to prevent any great loss of it due to destruction while subsequently cooking the mash under the high temperatures and pressures which are necessary to effect the proper modification of the starch.

A premalting period of at least 15 minutes is required, after which time (point 3) the temperature of the mash is raised to 160° C. (steam pressure, 75 lbs./sq. in. gauge). The time necessary to carry out this operation will vary in practice according to the equipment and other facilities of different plants, but, in general, this period should be about 15 to 20 minutes. It will be noted, however, that the heating and cooling operations should be done as rapidly as possible to prevent "over-cooking" of the mashes. The fermentability of the mash will be high over a wide range of cooking times. However, a loss of fermentability is observed in the "over-cooked" mashes, or those in which the grains are burned, due to a destruction of sugar, and possible formation of toxic or inhibitory materials.

The holding time at 160° C. (points 4–5) can be varied, depending upon the rate at which the temperature of the mash can be changed. Generally, this time interval should be from 1 to 5 minutes. The temperature is lowered from 160° C. to 75° C. as rapidly as possible. The use of a vacuum will decrease greatly the period required to perform this operation. The remaining one-half of the malt solids is added when the temperature has reached 75° C. and the mash is again premalted for at least 15 minutes at 70–75° C. (points 6–7). After the second premalting step, the mash is again heated to 160° C. (steam pressure, 75 lbs./sq. in. gauge) as in the previous cooking procedure. The heating and cooling are done again as rapidly as possible. The mash is held at 160° C. for about 1 to 5 minutes (points 8–9) and the temperature is then lowered to 60° C. (point 10).

The malt extract is added to the doubly cooked and doubly premalted mash and the mixture is held at about 55° C. for the duration of the saccharification period. The time of saccharification will vary according to plant equipment and schedules. We have found that the "complete conversion" (i. e., as measured by sugar formation) is obtained in about 15–60 minutes. However, traces of dextrins exhibiting an iodine color test do not disappear until 2½ to 3 hours after the addition of the malt extract. Since the iodine color is only an indication of the degree of degradation of the dextrins and there is only a comparatively negligible amount of sugar formed after the first hour of saccharification, the time of conversion may be shortened to 60 minutes or less without causing an appreciable reduction in the total amount of fermentable sugar obtained.

Our invention may be illustrated by the following specific examples. Although the examples given illustrate a batch process, it is to be understood that our invention is readily adapted to the use of continuous cooking and saccharifying equipment.

*Example I*

A barley malt extract was made by adding 152 lbs. of ground distillers' barley malt to 1333 lbs. of water at 20° C. The pH of the slurry was adjusted to 5.2 with 135 mls. of concentrated sulfuric acid (specific gravity=1.834). The resulting infusion was agitated for 30 minutes and allowed to settle for 30 minutes. One hundred gallons of supernatant diastatic solution was separated and held in a clean container at 20° C. for the final saccharification. The mash was prepared by first adding 3332 lbs. of water to the cooker and then introducing 1360 lbs. of ground whole corn. The pH was brought to 5.0 with 700 mls. of concentrated sulfuric acid. The temperature was raised to 75° C. and one-half of the malt solids was then added, bringing the temperature of the mash to 70° C., where it was held for 15 minutes. The mash was heated to 160° C. in 15 minutes and held for 5 minutes. The temperature was lowered to 75° C. in about 15 minutes by venting the cooker to the atmosphere and by the application of a vacuum. At this point, the remaining one-half of the malt solids was added bringing the temperature to 70° C. where it was held for a second 15-minute premalting period. The mash, now thoroughly liquefied, was again heated to 160° C. in 15 minutes and held for 5 minutes. The temperature was lowered to 60° C. in about 20 minutes by venting the cooker to the atmosphere and by the application of a vacuum. The malt extract (100 gallons) was added bringing the temperature to 55° C. which was maintained for 3 hours. The mash was then sterilized for 30 minutes at 135° C. (steam pressure, 30 lbs./sq. in. gauge).

Tests on the converted mash gave the following results:

Free sugar, as maltose hydrate _____ 9.00%
Total sugar, as glucose _____ 10.75%
Conversion _____ 83.60%
Filterability _____ Good
Iodine color _____ Negative

*Example II*

Same as Example I, except that the time of heating the mash during the premalting period at 75° C. was 30 instead of 15 minutes, and the subsequent heating periods to raise the temperature to 160° C. was 7 instead of 15 minutes. The final heating period (saccharification) prior to sterilization was also changed from 3 to 1½ hours at 55° C. and then raised to 70° C. for 45 minutes, the sterilization itself being accomplished in 15 instead of 30 minutes.

Tests on the converted mash gave the following results:

Free sugar, as maltose hydrate _____ 8.79%
Total sugar, as glucose _____ 9.96%
Conversion _____ 87.60%
Filterability _____ Good
Iodine color _____ Negative

Having thus described our invention, we claim:

1. The method of converting substantially completely the starch in starchy materials to fermentable sugars comprising forming a mixture of the material with water, acidifying the mixture and alternately premalting it with malt solids, and cooking it a plurality of times, at least one of the cooking temperatures being not less than 150° C., followed by saccharification with malt extract.

2. The method of converting substantially completely the starch in starchy materials to fermentable sugars comprising forming a mixture of the material with water, acidifying the mixture and alternately premalting it with malt solids, and cooking it a plurality of times, at least one of the cooking temperatures being not less than 150° C., followed by the addition of malt extract and heating at about 55° C. for one to three hours.

3. The method of converting substantially completely the starch in starchy materials to fermentable sugars comprising forming a mixture of the material with water, acidifying the mixture at pH 5.0 to 5.6 and alternately premalting it with malt solids, and cooking it at a plurality of times, at least one of the cooking temperatures being not less than 150° C., followed by saccharification with malt extract.

4. The method of converting substantially completely the starch in starchy materials to fermentable sugars comprising forming a mixture of the material with water, acidifying the mixture and alternately premalting it with malt solids, and cooking it a plurality of times, at least one of the cooking temperatures being not less than 150° C., followed by saccharification with malt extract and thermal sterilization.

5. The method of converting substantially completely the starch in starchy materials to fermentable sugars comprising forming a mixture of the material with water, acidifying the mixture, alternately premalting the mixture with malt solids at a temperature of 70° to 75° C. and cooking it a plurality of times, at least one of the cooking temperatures being not less than 150° C., followed by saccharification with malt extract.

6. The method of converting substantially completely the starch in starchy materials to fermentable sugars comprising forming a mixture of the material with water, acidifying the mixture, alternately premalting with malt solids and cooking at temperatures of about 70° to 75° C. and about 150° to 160° C., respectively, followed by saccharification with malt extract.

7. The method of converting substantially completely the starch in starchy materials to fermentable sugars comprising forming a mixture of the material with water, acidifying the mixture, premalting the mixture with malt solids at a temperature of 70° to 75° C., cooking at a temperature of 100° to 150° C., premalting and cooking the mixture at least one more time each, then adding malt extract and heating at about 55° C. for one to three hours.

8. The method of converting substantially completely the starch in starchy materials to fermentable sugars comprising forming a mixture of the material with water, acidifying the mixture, premalting the mixture with malt solids at a temperature of 70° to 75° C., cooking at a temperature of 100° to 150° C., premalting and cooking the mixture at least one more time each, one of said cooking steps being conducted at a temperature of not less than 150° C., then adding malt extract and heating at about 55° C. for one to three hours.

9. The method of converting substantially completely the starch in grain to fermentable sugars comprising forming a mixture of the grain with water, acidifying the mixture and alternately premalting it with malt solids and cooking it a plurality of times, at least one of the cooking temperatures being not less than 150° C., followed by saccharification with malt extract.

ROBERT G. DWORSCHACK.
EVERETTE M. BURDICK.

REFERENCES CITED

The following references are of record in the file of this patent:

UNITED STATES PATENTS

| Number | Name | Date |
| --- | --- | --- |
| 2,222,306 | Atwood | Nov. 19, 1940 |
| 2,348,451 | Christensen | May 9, 1944 |
| 1,737,279 | Wallerstein | Nov. 26, 1929 |
| 466,151 | Billings | Dec. 29, 1891 |
| 645,835 | Schmitz | Mar. 20, 1900 |

FOREIGN PATENTS

| Number | Country | Date |
| --- | --- | --- |
| 11,209 | Dutch | Apr. 15, 1924 |